United States Patent
Xiao et al.

(10) Patent No.: US 9,229,094 B2
(45) Date of Patent: Jan. 5, 2016

(54) METHOD AND DEVICE USING OBSERVED TIME DIFFERENCE OF ARRIVAL FOR POSITIONING MOBILE STATION

(71) Applicant: Huawei Technologies Co., Ltd., Shenzhen (CN)

(72) Inventors: Dengkun Xiao, Shenzhen (CN); Jie Cui, Shenzhen (CN); Yuanfeng Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 14/229,417

(22) Filed: Mar. 28, 2014

(65) Prior Publication Data
US 2014/0213289 A1    Jul. 31, 2014

Related U.S. Application Data

(63) Continuation of application No. PCT/CN2012/082332, filed on Sep. 28, 2012.

(30) Foreign Application Priority Data

Sep. 28, 2011    (CN) .......................... 2011 1 0302008

(51) Int. Cl.
*G01S 5/10* (2006.01)
*H04W 64/00* (2009.01)
(Continued)

(52) U.S. Cl.
CPC ................. *G01S 5/10* (2013.01); *G01S 5/0009* (2013.01); *G01S 5/0205* (2013.01); *H04W 64/00* (2013.01)

(58) Field of Classification Search
CPC .... H04W 64/00; H04W 24/10; G01S 5/0009; G01S 5/0263; H04L 27/2613; H04L 5/0044
See application file for complete search history.

(56) References Cited

U.S. PATENT DOCUMENTS

2009/0011775 A1    1/2009    Niemenmaa et al.
2010/0273506 A1*   10/2010   Stern-Berkowitz ... G01S 5/0009
                                                          455/456.1
(Continued)

FOREIGN PATENT DOCUMENTS

CN        101035379 A        9/2007
CN        101379854 A        3/2009
(Continued)

OTHER PUBLICATIONS

Lte, "3rd Generation Partnership Project; Technical Specification Group Radio Access Network; Evolved Universal Terrestrial Radio Access (E-UTRA); Physical layer; Measurements" (Release 10) 3GPP TS 36.214, V10.0.0 Dec. 2010, 13 pages.

(Continued)

*Primary Examiner* — Matthew Sams
(74) *Attorney, Agent, or Firm* — Brinks Gilson & Lione

(57) ABSTRACT

A method using OTDOA for positioning a mobile station includes: transmitting to the mobile station an OTDOA capability request message to inquire about a communication system format supported by the mobile station and signal reception quality information of each base station of a communication system supported, where the OTDOA capability request message includes a plurality of communication formats existent in a current service area of the mobile station and corresponding signal reception quality information, provided for the mobile station to select based on the communication system format supported by the mobile station; receiving an OTDOA support capability message returned by the mobile station, where the OTDOA support capability message includes the communication system format supported by the mobile station and corresponding signal reception quality; sending to the mobile station auxiliary positioning information based on the communication system format supported by the mobile station and the corresponding signal reception quality.

9 Claims, 7 Drawing Sheets

(51) Int. Cl.
*G01S 5/00* (2006.01)
*G01S 5/02* (2010.01)

(56) References Cited

U.S. PATENT DOCUMENTS

| | | | |
|---|---|---|---|
| 2011/0077030 A1 | 3/2011 | Wigren et al. | |
| 2011/0176499 A1* | 7/2011 | Siomina | G01S 1/042 370/329 |
| 2011/0230144 A1* | 9/2011 | Siomina | H04L 5/0044 455/68 |
| 2012/0040687 A1* | 2/2012 | Siomina | G01S 5/0205 455/456.1 |
| 2012/0082091 A1* | 4/2012 | Siomina | H04W 4/02 370/328 |
| 2012/0088518 A1* | 4/2012 | Edge | H04W 64/00 455/456.1 |
| 2012/0113837 A1* | 5/2012 | Siomina | H04W 24/10 370/252 |
| 2012/0295623 A1* | 11/2012 | Siomina | H04W 64/00 455/436 |
| 2013/0188510 A1* | 7/2013 | Siomina | H04W 24/10 370/252 |
| 2014/0092844 A1* | 4/2014 | Xiao | H04W 48/16 370/329 |

FOREIGN PATENT DOCUMENTS

| | | |
|---|---|---|
| CN | 102186191 A | 9/2011 |
| CN | 102196558 A | 9/2011 |
| WO | WO 2011/099909 A1 | 8/2011 |

OTHER PUBLICATIONS

Lte, "3$^{rd}$ Generation Partnership Project; Technical Specification Group Radio Access Network; Evolved Universal Terrestrial Radio Access (E-UTRA); Requirements for support of radio resource management" (Release 10) 3GPP TS 36.133, V10.3.0, Jun. 2011, 457 pages.

LTE, "3$^{rd}$ Generation Partnership Project; Technical Specification Group Radio Access Network; Evolved Universal Terrestrial Radio Access (E-UTRA); LTE Positioning Protocol (LPP) (Release 9)," 3GPP TS 36.355, V9.7.0, Sep. 2011, 115 pages.

* cited by examiner

METHOD AND DEVICE USING OBSERVED TIME DIFFERENCE OF ARRIVAL FOR POSITIONING MOBILE STATION

CROSS-REFERENCE TO RELATED APPLICATIONS

This application is a continuation of International Application No. PCT/CN2012/082332, filed on Sep. 28, 2012, which claims priority to Chinese Patent Application No. 201110302008.X, filed on Sep. 28, 2011, both of which are hereby incorporated by reference in their entireties.

TECHNICAL FIELD

The present invention relates to mobile station positioning technologies, and in particular, to a method using an observed time difference of arrival (OTDOA) for positioning a mobile station, a positioning server and a mobile station.

BACKGROUND

A positioning technology is a technology for determining a geographical position of a mobile station, which particularly can directly or indirectly obtain the position information of the mobile station using resources of a wireless communication network.

There are three standard manners for positioning a UE in the existing communication system, a network-assisted GNSS positioning, a downlink positioning and an e-CID positioning.

When a mobile station in the existing communication system is positioned, characteristic parameters of a radio wave propagation signal between the mobile station and a base station, such as a signal field strength, a time difference of arrival of a propagation signal and an angle-of-arrival of a signal are generally detected first, and a geometric position of the mobile station is then estimated using a corresponding positioning formula (detection of the field strength and the time of arrival are mainly implemented by the mobile station, and estimation of the angle-of-arrival of the signal is mainly implemented by the base station).

The downlink positioning belongs to a network positioning, and is mainly to detect characteristic parameters of radio resources within a mobile communication system and estimate a position of a mobile station according to a corresponding positioning formula.

An OTDOA positioning manner is one of the downlink positioning manners, a mobile station receives downlink positioning reference signals of a plurality of base stations in a single communication system, performs a timing measurement, and reports to a network positioning server a time difference of arrival for PRS between base stations, and the network positioning server calculates according to the time difference of arrival for PRS between base stations to obtain a geographical position of the mobile station.

The prior art has deficiencies that, positioning is performed by the OTDOA with a time difference of arrival for PRS between base stations of a single system, which causes lower positioning accuracy.

SUMMARY

Embodiments of the present invention provide a method and a device using an observed time difference of arrival for positioning a mobile station, so as to improve the accuracy of the OTDOA positioning.

Embodiments of the present invention provide a method using an observed time difference of arrival for positioning a mobile station, including:

transmitting to a mobile station an observed time difference of arrival (OTDOA) capability request message to inquire about a communication system format supported by the mobile station and signal reception quality information of each base station of a communication system supported, where the OTDOA capability request message includes a plurality of communication system formats existent in a current service area of the mobile station and corresponding signal reception quality information, provided for the mobile station to select based on the communication system format supported by the mobile station;

receiving an OTDOA support capability message returned by the mobile station, where the OTDOA support capability message includes the communication system format supported by the mobile station and corresponding signal reception quality;

sending to the mobile station auxiliary positioning information based on the communication system format supported by the mobile station and the corresponding signal reception quality, so that the mobile station can report a corresponding measurement result based on the auxiliary positioning information; and using the measurement result to position the mobile station.

Embodiments of the present invention also provide a method using an observed time difference of arrival for positioning a mobile station, including:

receiving an observed time difference of arrival (OTDOA) capability request message, transmitted by a positioning server, where the OTDOA capability request message includes a plurality of communication formats existent in a current service area of a mobile station and corresponding signal reception quality information.

selecting a communication system format supported by the mobile station from the plurality of communication system formats;

transmitting to the positioning server an OTDOA support capability message, where the OTDOA support capability message includes the communication system format supported by the mobile station and corresponding signal reception quality;

receiving auxiliary positioning information sent by the positioning server; and reporting a corresponding measurement result based on the auxiliary positioning information, so that the positioning server use the measurement result to position the mobile station.

Embodiments of the present invention also provide a positioning server using an observed time difference of arrival for positioning a mobile station, including:

a capability inquiry module, configured to transmit to a mobile station an observed time difference of arrival (OTDOA) capability request message to inquire about a communication system format supported by the mobile station and signal reception quality information of each base station of a communication system supported, where the OTDOA capability request message includes a plurality of communication formats existent in a current service area of the mobile station and corresponding signal reception quality information, provided for the mobile station to select based on the communication system format supported by the mobile station;

a capability reception module, configured to receive an OTDOA support capability message returned by the mobile station, where the OTDOA support capability message includes the communication system format supported by the mobile station and corresponding signal reception quality;

an auxiliary information sending module, configured to send to the mobile station auxiliary positioning information based on the communication system format supported by the mobile station and the corresponding signal reception quality, so that the mobile station reports a corresponding measurement result based on the auxiliary positioning information; and a positioning module, configured to use the measurement result to position the mobile station.

Embodiments of the present invention also provide a mobile station using an observed time difference of arrival for positioning, including:

a capability inquiry reception module, configured to receive an observed time difference of arrival (OTDOA) capability request message, transmitted by a positioning server, where the OTDOA capability request message includes a plurality of communication formats existent in a current service area of the mobile station and corresponding signal reception quality information;

a system format selection module, configured to select a communication system format supported by the mobile station from the plurality of communication system formats;

a capability reporting module, configured to transmit to the positioning server an OTDOA support capability message, where the OTDOA support capability message includes the communication system format supported by the mobile station and corresponding signal reception quality;

an auxiliary information reception module, configured to receive auxiliary positioning information sent by the positioning server;

a measurement result reporting module, configured to report a corresponding measurement result based on the auxiliary positioning information, so that the positioning server use the measurement result to position the mobile station.

In the method and device using an observed time difference of arrival for positioning a mobile station provided in embodiments of the present invention, the positioning server transmits to the mobile station to inquire about the communication system format supported by the mobile station and the signal reception quality information of each base station of the communication system supported, and sends to the mobile station the auxiliary positioning information based on the communication system format supported by the mobile station and the corresponding signal reception quality, so that the mobile station reports the corresponding measurement result based on the auxiliary positioning information, and the positioning server uses the measurement result to perform positioning, thereby improving an accuracy of the TODOA positioning.

BRIEF DESCRIPTION OF DRAWINGS

To illustrate the technical solutions of the present invention more clearly, the accompanying drawings used in embodiments will be introduced in brief hereinafter. Apparently, the accompanying drawings described in the following merely show some embodiments of the present invention, and persons skilled in the art can derive other drawings from them without creative efforts.

DESCRIPTION OF EMBODIMENTS

The technical solutions in the embodiments of the present invention are hereinafter described clearly and completely with reference to the accompanying drawings in the embodiments of the present invention. Obviously, the embodiments described here are only a part of the embodiments of the present invention, but not all the embodiments. All other embodiments obtained by persons skilled in the art based on the embodiments of the present invention without any creative efforts all fall within the protection scope of the present invention.

In a future communication system, a variety of communication systems may coexist, systems such as LTE, GSM, and WCDMA will exist in a current service area of a mobile station at the same time, and large amounts of UEs supporting multimode will also exist.

Figure 1:
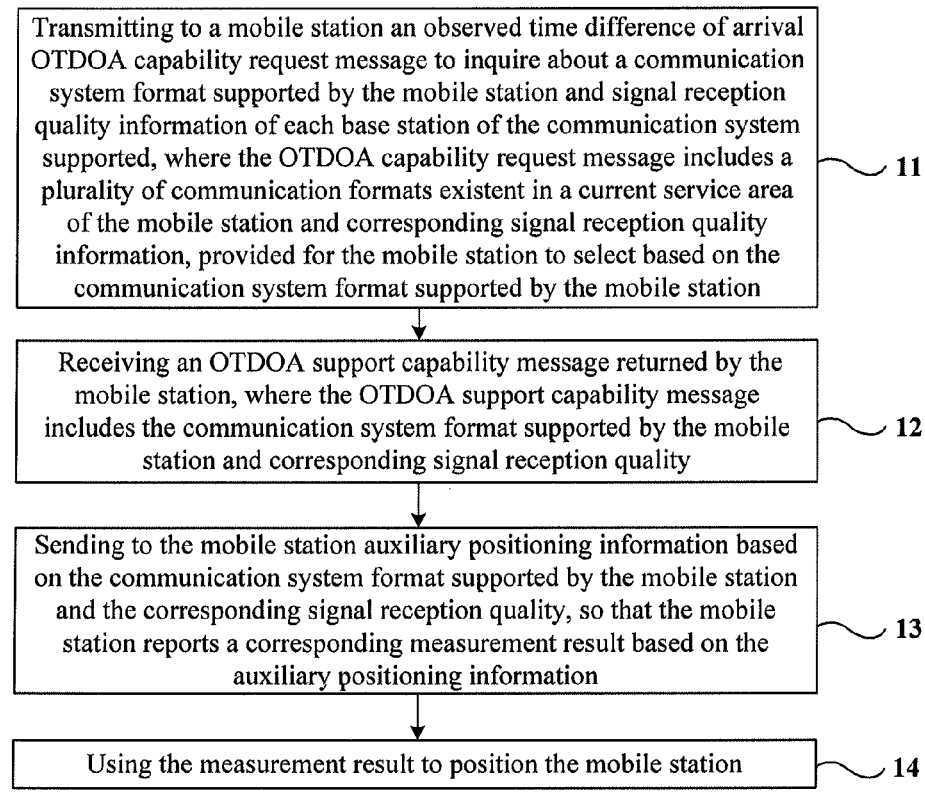
FIG. 1 is a flow chart of a method using an observed time difference of arrival for positioning a mobile station according to an embodiment of the present invention.

FIG. 1 is a flow chart of a method using an observed time difference of arrival for positioning a mobile station according to an embodiment of the present invention. This embodiment illustrates the method for positioning from a positioning server side. As shown in FIG. 1, the method using the OTDOA for positioning the mobile station includes:

Step 11, transmitting to a mobile station an observed time difference of arrival OTDOA capability request message to inquire about a communication system format supported by the mobile station and signal reception quality information of each base station of the communication system supported, where the OTDOA capability request message includes a plurality of communication formats existent in a current service area of the mobile station and corresponding signal reception quality information, provided for the mobile station to select based on the communication system format supported by the mobile station;

Step 12, receiving an OTDOA support capability message returned by the mobile station, where the OTDOA support capability message includes the communication system format supported by the mobile station and corresponding signal reception quality;

Step 13, sending to the mobile station auxiliary positioning information based on the communication system format supported by the mobile station and the corresponding signal reception quality, so that the mobile station reports a corresponding measurement result based on the auxiliary positioning information; and Step 14, using the measurement result to position the mobile station.

Since the base stations of different communication systems all can transmit positioning reference signals, and the positioning server needs to decide the mobile station performs an RSTD measurement on which base station of which system according to the obtained information. If a single existing communication system is used, according to provisions under LTE protocol TS36.133, each mobile station needs to measure at least 16 cells, however, the mobile station has different reception qualities for each base station of each system, if the RSTD measurement is performed in a cell of the existing communication system with poor signal quality, it may cause problems that the mobile station fails to accurately receive PRS or fails to accurately estimate a time of arrival for a first arrival path, and reports to the positioning server e-SMLC an inaccurate RSTD, leading to enlargement of a positioning error and lower positioning accuracy. Therefore, when positioning initialization is performed, the mobile station shall report to the positioning server, based on its measurement and signal quality of each base station in various communication systems, which includes RSRP and RSRQ of an EUTRA base station, RSSI and RSCP of a UTRA base station, RSSI of a GSM base station, and so on. The positioning server can select an appropriate base station for the mobile station to perform positioning based on signal reception quality information of each base station in various systems reported by the mobile station, thereby guaranteeing better positioning reference signal reception quality and positioning accuracy.

Figure 2:
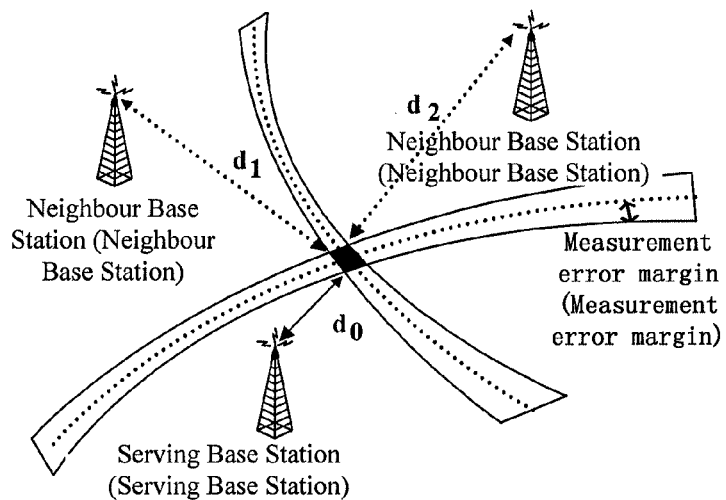
FIG. 2 is a schematic diagram of OTDOA positioning in the prior art.

The principle of applying OTDOA in a UTRAN system is that, when there are three or more base stations in the UTRAN system, a network positioning server can determine the position of the mobile station according to a time difference of arrival of downlink transmission signals of different base stations. The downlink transmission signal can be a reference signal, or can be a synchronization signal. As shown in FIG. 2, points having a constant distance difference to two fixed points form a hyperbola. When the UTRAN system has a base station 0, a base station 1 and a base station 2, a distance difference $d_1-d_0$ to the base station 0 and the base station 1 forms a hyperbola, and a distance difference $d_2-d_1$ to the base station 1 and the base station 2 forms another hyperbola, and the intersection of the two hyperbolas is the position of the mobile station. When the UTRAN system has more base stations, the position of the determined mobile station is more accurate, that is, the positioning accuracy of the mobile station is higher.

In the existing communication system, OTDOA positioning is a technology of a network assisted mobile station positioning. A network-side positioning server e-SMLC acquires transmission and reception configuration of a specified positioning reference signal (Positioning Reference Signal, PRS) for a mobile station through interacting with a base station, and then the base station transmits a downlink PRS, the mobile station receives PRS from each base station, and identifies a position of a first arrival path of each PRS to obtain a time difference of arrival for PRS of each base station, and reports the time difference of arrival for PRS of each base station to the e-SMLC. The e-SMLC maps the received time difference of arrival for PRS of each base station to a distance difference between the mobile station and each base station, and then uses a hyperbola mathematical model shown in FIG. 2 to calculate an accurate position of the mobile station.

Since the accuracy of the OTDOA positioning depends on PRS signal reception and first arrival path estimation to a larger extent, when multiple communication systems coexist and the mobile station supports multimode, in this embodiment, a network positioning server, according to distributions of the base stations in different communication systems, appropriately selects base stations with better signal reception quality to perform RSTD measurement, so that more accurate measurement values for a plurality of cells can be obtained, problems of failing to accurately receive PRS or failing to accurately estimate a time of arrival for a first arrival path caused by poor signal reception quality can be efficiently avoided, and the accuracy of the OTDOA positioning can be improved.

Figure 3A:
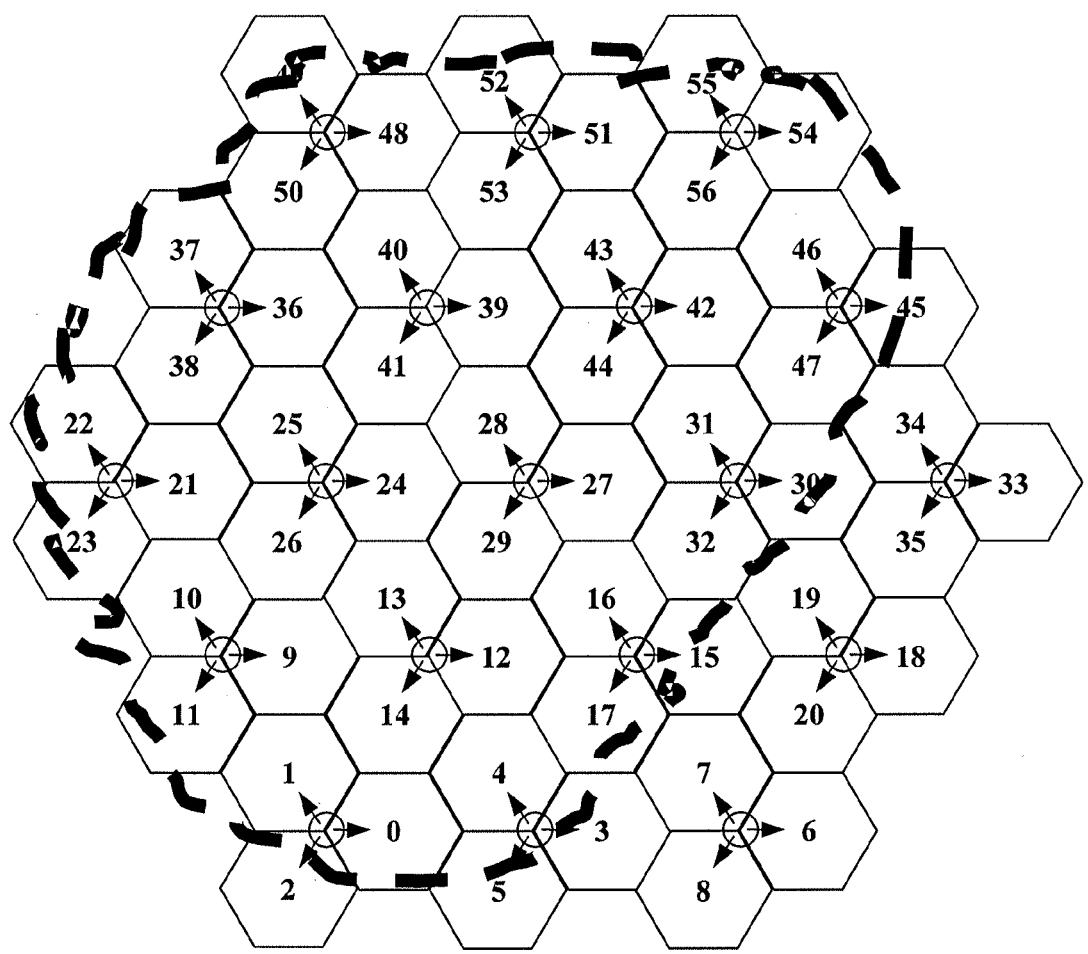
FIG. 3a is a schematic diagram of a single system topology in the prior art.
Figure 3B:
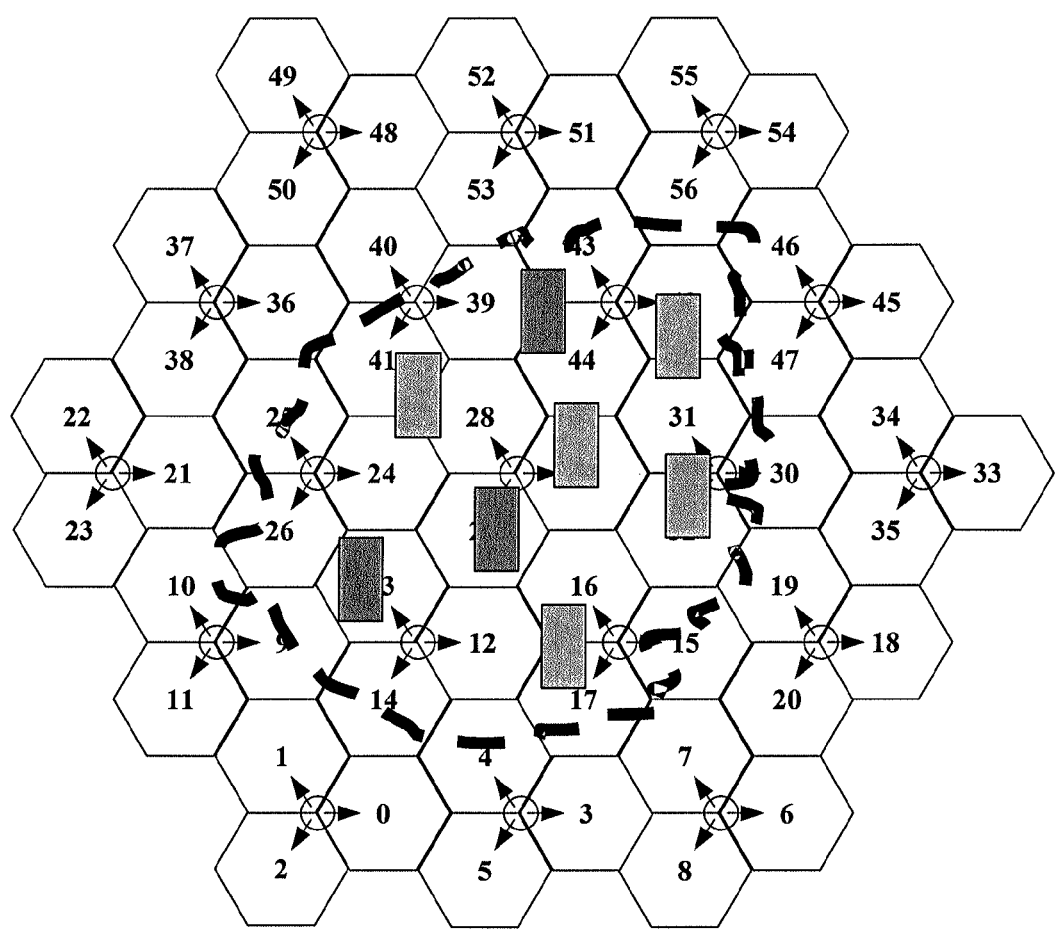
FIG. 3b is a schematic diagram of a multi-communication system topology in the prior art.

When a mobile station not supporting multimode is at a topology center of a single system topology, as shown in FIG. 3a, if 16 cells for positioning measurement, such as within a range identified by black dotted lines in FIG. 3a, are selected, it is likely to select a base station further away from a mobile station, thereby causing a poor quality of the positioning reference signal. For example, when a mobile station supporting multimode is in multi-communication systems, as shown in FIG. 3b, a coverage range of a first lap of LTE base stations is a range identified by black dotted lines in FIG. 3b, when base stations of GSM, WCDMA and so on coexist at the same time, rectangles with backgrounds of different gray levels in FIG. 3b are indicating base stations of different communication systems. The base stations of GSM, WCDMA and so on can be candidate base stations to participate in the positioning, so it is unnecessary to select an LTE base station further away from the mobile station to participate in the positioning, thereby improving signal reception quality of a downlink transmission signal for estimating a time difference and improving an accuracy of the positioning.

Figure 4:
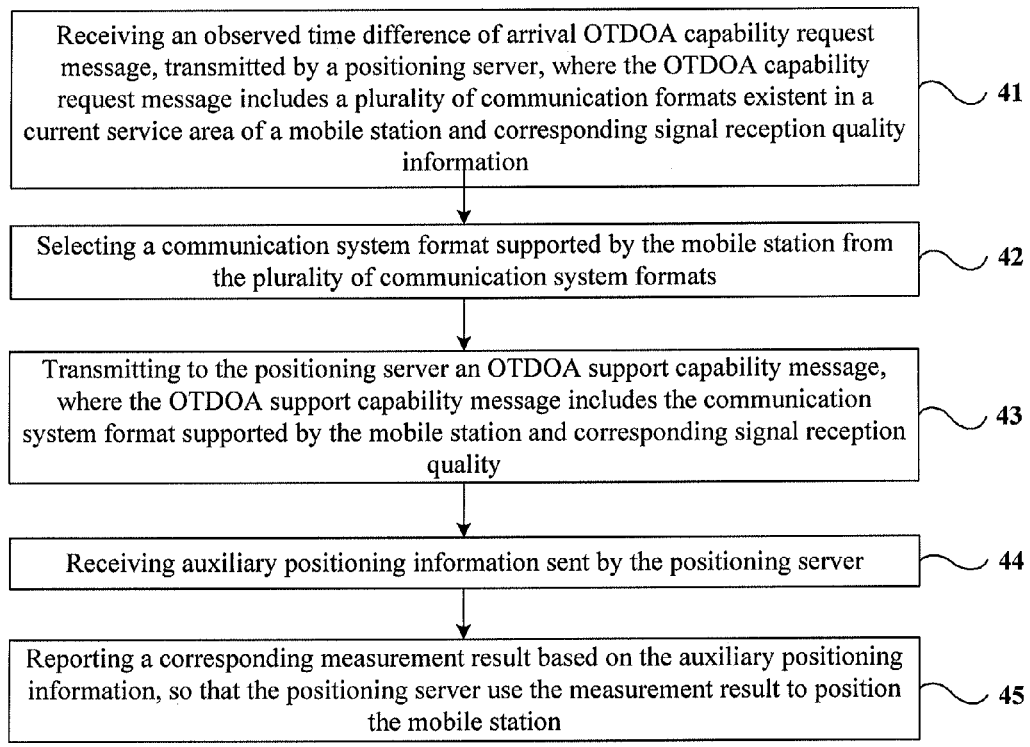
FIG. 4 is a flow chart of another method using an observed time difference of arrival for positioning a mobile station according to an embodiment of the present invention.

FIG. 4 is a flow chart of another method using an observed time difference of arrival for positioning a mobile station according to an embodiment of the present invention. This embodiment illustrates the method for positioning from a mobile station side, as shown in FIG. 4, the method using the OTDOA for positioning the mobile station includes:

Step 41, receiving an observed time difference of arrival OTDOA capability request message, transmitted by a positioning server, where the OTDOA capability request message includes a plurality of communication formats existent in a current service area of a mobile station and corresponding signal reception quality information.

Step 42, selecting a communication system format supported by the mobile station from the plurality of communication system formats;

Step 43, transmitting to the positioning server an OTDOA support capability message, where the OTDOA support capability message includes the communication system format supported by the mobile station and corresponding signal reception quality;

Step 44, receiving auxiliary positioning information sent by the positioning server; and Step 45, reporting a corresponding measurement result based on the auxiliary positioning information, so that the positioning server use the measurement result to position the mobile station.

Before selecting the communication system format supported by the mobile station from the plurality of communication system formats, the method can further includes:

judging whether the mobile station supports OTDOA positioning or not, if the mobile station supports the OTDOA positioning, then performing selecting the communication system format supported by the mobile station from the plurality of communication system formats; otherwise, using other positioning manner to position.

If the mobile station supports the OTDOA positioning, before selecting the communication system format supported by the mobile station from the plurality of communication system formats, the method further includes:

judging whether the mobile station supports multimode or not, if the mobile station supports multimode, then the procedure of selecting the communication system format supported by the mobile station from the plurality of communication system formats includes: selecting a plurality of communication system formats supported by the mobile station from the plurality of communication system formats; otherwise, the procedure of selecting the communication system format supported by the mobile station from the plurality of communication system formats includes: selecting one communication system format supported by the mobile station from the plurality of communication system formats.

Figure 5:
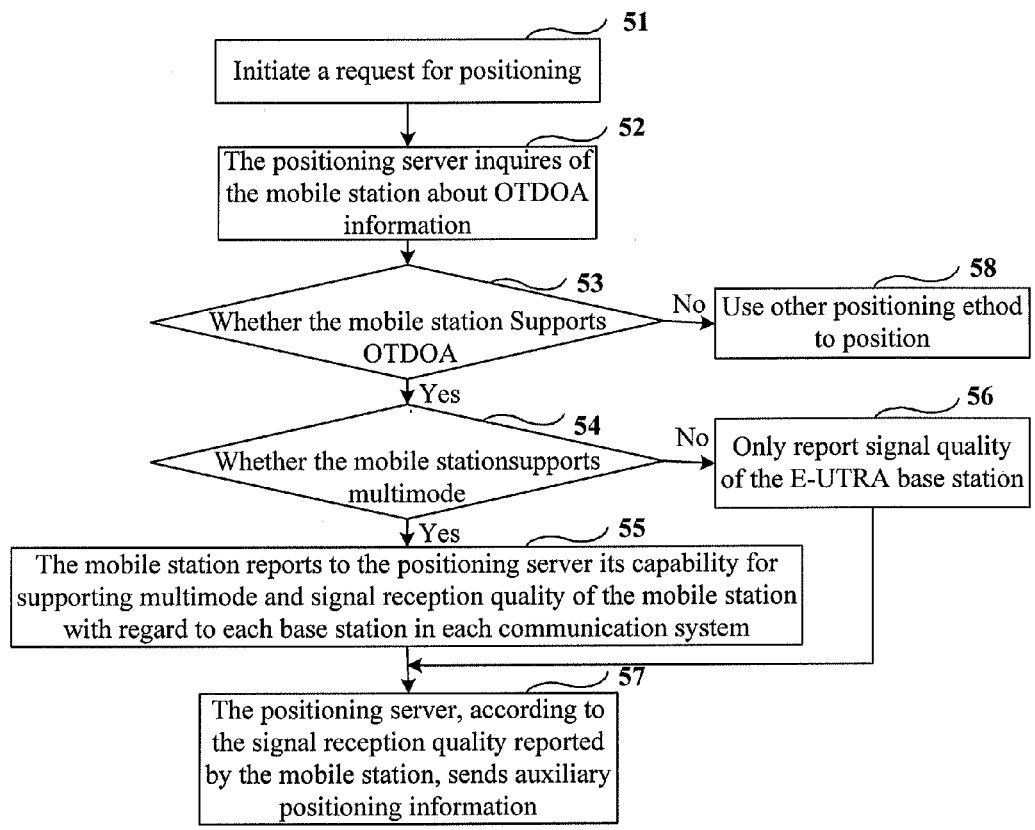
FIG. 5 is a flow chart of still another method using an observed time difference of arrival for positioning a mobile station according to an embodiment of the present invention.
Figure 6:
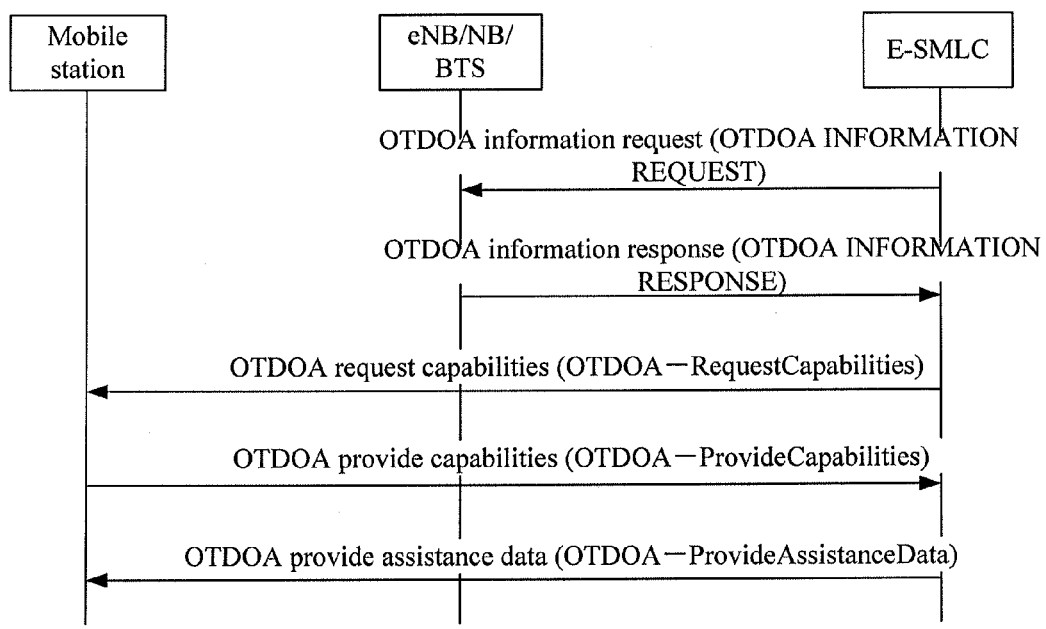
FIG. 6 is a signaling interaction diagram corresponding to the embodiment of FIG. 5.

FIG. 5 is a flow chart of still another method using an observed time difference of arrival for positioning a mobile station according to an embodiment of the present invention. This embodiment is based on an RRC-Connected state of a mobile station, and the mobile station has been activated before this process is performed. Signaling protocols involved in the positioning manner mainly include LPP (signal interaction between a positioning server and a mobile station, 3GPP Technical Specification 36.355TS36.355), LPPa (signal interaction between a positioning server and a mobile station, TS36.455). FIG. 6 is a signaling interaction diagram corresponding to the embodiment of FIG. 5. As shown in FIG. 5 and FIG. 6, the method using the OTDOA for positioning the mobile station includes:

Step 51, a mobility management entity (Mobile Management Entity, MME) initiates to a positioning server a request for positioning a certain mobile station;

Step 52, the positioning server inquires of the mobile station about whether OTDOA positioning is supported and OTDOA positioning capability.

Specifically, as shown in FIG. 6, the positioning server sends "OTDOA-RequestCapablities" to the mobile station, and inquires of a UE about whether the OTDOA positioning is supported and the OTDOA positioning capability, containing a newly added inquiry about the communication system format supported by the mobile station and the signal reception quality information of each base station in various systems, such as RSRP and RSRQ of an E-UTRA base station, RSSI and RSCP of a UTRA base station, RSSI of a GSM base station, and so on.

Prior to this, the positioning server sends an "OTDOA INFORMATION REQUEST" to eNB/NB/BTS and inquires of the eNB/NB/BTS about OTDOA positioning information; the eNB/NB/BTS reports an "OTDOA INFORMATION RESPONSE" to the positioning server, which includes a carrier frequency supported by the eNB/NB/BTS; and informs the positioning server of identifications of cells in which the mobile station needs to receive a PRS, frequency points and PRS configuration information of these cells.

Step 53, the mobile station judges whether itself supports OTDOA positioning, if yes, perform step 54, otherwise, perform step 58.

Step 54, the mobile station judges whether itself supports multimode, and the mobile station supporting multimode can perform measurement on base stations of different communication systems; if yes, perform step 55, otherwise, performs step 56.

Step 55, the mobile station reports to the positioning server its capability of supporting multimode and signal reception quality of the mobile station with regard to each base station in each communication system.

Specifically, as shown in FIG. 6, the mobile station reports to the positioning server OTDOA-Provided Capabilities ("OTDOA-ProvideCapablities") containing multi RTA information (containing multi RTA information), OTDOA capability of the mobile station, the newly added communication system format supported by the mobile station and the signal reception quality information of each base station in each communication system, such as RSRP and RSRQ of the EUTRA base station, RSSI and RSCP of the UTRA base station, RSSI of the GSM base station, and so on.

Step 56, the mobile station only reports to the positioning server signal reception quality of the mobile station with regard to an E-UTRA base station. Specifically, as shown in FIG. 6, the mobile station reports to the positioning server "OTDOA-Provided Capabilities" containing OTDOA capability of the mobile station, and RSRP and RSRQ of the EUTRA base station.

Step 57, the positioning server, according to the signal reception quality reported by the mobile station, sends auxiliary positioning information, that is, information reported by the base station when the positioning server interacts with the base station, so as to indicate the mobile station to select a base station with a good channel for positioning the mobile station. The auxiliary positioning information includes identifications of cells in which the mobile station needs to receive a PRS, frequency points and PRS configuration information of these cells.

Specifically, as shown in FIG. 6, the positioning server sends "OTDOA-ProvideAssistanceData" to the mobile station, and informs the mobile station of the auxiliary positioning information.

Step 58: Use other positioning manner to position.

In this embodiment, the positioning server can know various communication systems supported by the mobile station and also signal reception quality from each base station received by the mobile station in various communication systems, through carrying a plurality of communication formats and corresponding signal reception quality in a current service area of the mobile station in an interactive process with the mobile station. In this way, the positioning server, according to communication systems supported by the mobile station, informs the mobile station of performing RSTD measurement on a base station with best signal quality, and then performs positioning calculations according to the measurement result to position the mobile station.

Hereinafter, the method using the OTDOA for positioning the mobile station will be described in detail by respectively taking a mobile station supporting multimode and a mobile station not supporting multimode as an example.

Embodiment of positioning a mobile station supporting multimode

Assuming a certain mobile station supports multimode, and there are E-UTRA, UTRA and GSM systems existent in the current service area of the mobile station, namely a radio environment where the mobile station is located, the procedure of performing OTDOA positioning for the mobile station includes:

Step one: the mobile station initiates a "Location service request" to an MME;

Step two: the MME transparently transmits to a positioning server;

Step three: the positioning server transmits a "capability request" to the mobile station, and meanwhile inquires about a communication system format supported by the mobile station and signal reception quality information of each base station in various systems.

For example, the positioning server sends to the mobile station OTDOA-RequestCapablities,

```
-- ASN1START
OTDOA-RequestCapabilities ::= SEQUENCE {
    UE  capabilities    support    multi RAT
    RSRP and RSRQ       in EUTRA
    RSSI/RSCP           in UTRA
    RSSI                in GSM
    ...
}
-- ASN1STOP
```

Step four: the mobile station transmits capability provide to the positioning server to reply that it supports OTDOA positioning, and meanwhile reports communication system formats supported by the mobile station and the signal reception quality information of each base station in various systems, such as RSRP and RSRQ of an EUTRA base station, RSSI and RSCP of a UTRA base station, RSSI of a GSM base station, and so on.

The mobile station reports OTDOA-ProvideCapablities to the positioning server.

```
-- ASN1START
OTDOA-ProvideCapabilities ::= SEQUENCE {
    otdoa-Mode    BIT STRING { ue-assisted (0) }(SIZE (1..8)),
    ...,
    supportedBandListEUTRA      SEQUENCE    (SIZE
        (1..maxBands))    OF
SupportedBandEUTRA    OPTIONAL
}
maxBands INTEGER ::= 64
SupportedBandEUTRA ::= SEQUENCE {
    bandEUTRA                              INTEGER (1..64))
    UE  capabilities    support  multi RAT
    RSRP and RSRQ       in EUTRA
    RSSI/RSCP           in UTRA
    RSSI                in GSM
-- ASN1STOP
```

This embodiment is applicable to a multi-system scenario where a mobile station supporting multimode selects appropriate base stations to perform OTDOA positioning.

Embodiment of positioning a mobile station not supporting multimode

Assuming a certain mobile station only supports an E-UTRA system, but there are E-UTRA, UTRA and GSM systems existent in the current service area of the mobile station, the procedure of performing OTDOA positioning for the mobile station includes:

Step one: the mobile station initiates a "Location service request" to an MME;

Step two: the MME transparently transmits to a positioning server;

Step three: the positioning server transmits a capability request to the mobile station, and meanwhile inquires about a communication system format supported by it and signal reception quality information of each base station in various systems.

For example, the positioning server sends to the mobile station OTDOA-RequestCapablities,

```
-- ASN1START
OTDOA-RequestCapabilities ::= SEQUENCE {
    UE  capabilities    support    multi RAT
    RSRP and RSRQ       in EUTRA
    RSSI/RSCP           in UTRA
    RSSI                in GSM
    ...
}
-- ASN1 STOP
```

Step four: the mobile station transmits capability provide to the positioning server to reply that it supports OTDOA positioning, and reports that it only supports E-UTRA communication system and the signal reception quality information of each base station in the E-UTRA, such as RSRP and RSRQ, and so on.

For example, when a UE reports OTDOA-ProvideCapablities to the positioning server,

```
-- ASN1START
OTDOA-ProvideCapabilities ::= SEQUENCE {
    otdoa-Mode    BIT STRING { ue-assisted (0) }(SIZE (1..8)),
    ...,
    supportedBandListEUTRA      SEQUENCE    (SIZE
        (1..maxBands))   OF
SupportedBandEUTRA    OPTIONAL
}
maxBands INTEGER ::= 64
SupportedBandEUTRA ::= SEQUENCE {
    bandEUTRA                              INTEGER (1..64)}
    UE  capabilities    support   EUTRA
    RSRP and RSRQ       in EUTRA
ASN1STOP
```

In this embodiment, the mobile station carries the communication system supported by itself and the signal reception quality information of each base station in the communication system in the reported "OTDOA-ProvideCapablities", so that the method using the OTDOA for positioning the mobile station provided in embodiments of the present invention is also applicable to a single-mode mobile station, improving flexibility of the positioning.

Figure 7:
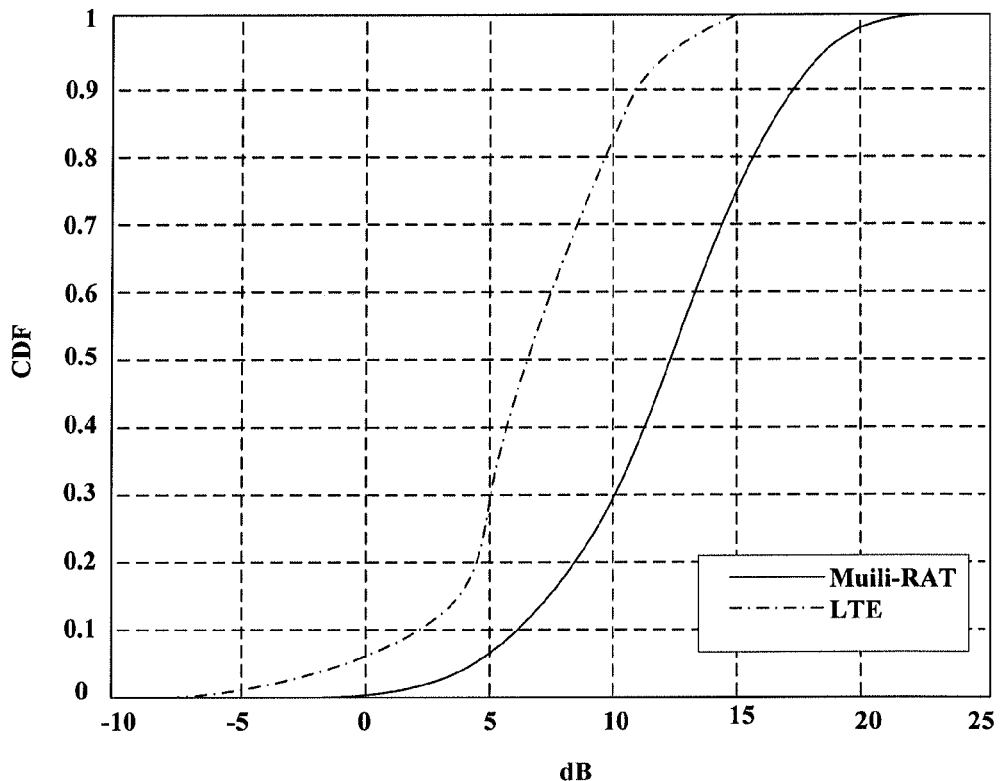
FIG. 7 is a schematic diagram of cumulative probability of SNR values for PRS averagely received at a mobile station side obtained by the method using an observed time difference of arrival (OTDOA) for positioning a mobile station according to an embodiment of the present invention.

In the above embodiment, the communication system supported by the mobile station and the corresponding signal reception quality are acquired, a base station in a communication system allowing the mobile station to receive a PRS with a better quality is selected to send the PRS to the mobile station, so that quality of receiving the PRS by the mobile station can be guaranteed and power consumption of the mobile station can be reduced. As shown in FIG. 7, using base stations in multiple communication systems to perform positioning measurement, an SNR value averagely received at a mobile station side is significantly higher than the average SNR value using a single LTE network, and moreover, quality improvement of PRS directly improves an accuracy of the positioning.

It should be appreciated by persons skilled in the art that, all or a part of the steps in the above method embodiments may be completed by relevant hardware under the instruction of a program, and the program may be stored in a computer readable storage medium, when the program is executed, the steps in the method of the above embodiments are performed; the storage medium comprises various media capable of storing program codes, such as ROM, RAM, a floppy disk, or an optical disk and the like.

Figure 8:
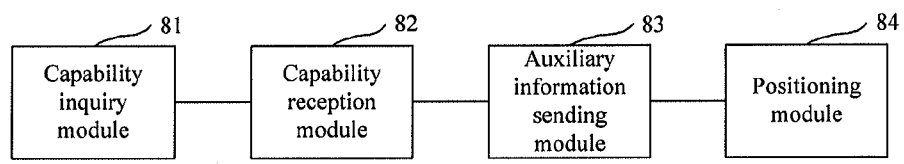
FIG. 8 is a schematic structural diagram of a positioning server using an observed time difference of arrival for positioning a mobile station according to an embodiment of the present invention.

FIG. 8 is a schematic structural diagram of a positioning server using an observed time difference of arrival for positioning a mobile station according to an embodiment of the present invention. As shown in FIG. 8, the positioning server for implementing the method in the embodiment shown in FIG. 1 includes:

a capability inquiry module 81, configured to transmit to a mobile station an observed time difference of arrival OTDOA capability request message to inquire about a communication system format supported by the mobile station and signal reception quality information of each base station of the communication system supported, where the OTDOA capability request message includes a plurality of communication formats existent in a current service area of the mobile station and corresponding signal reception quality information, provided for the mobile station to select based on the communication system format supported by the mobile station;

a capability reception module 82, configured to receive the OTDOA support capability message returned by the mobile station, where the OTDOA support capability message includes the communication system format supported by the mobile station and corresponding signal reception quality;

an auxiliary information sending module 83, configured to send to the mobile station auxiliary positioning information based on the communication system format supported by the mobile station and the corresponding signal reception quality, so that the mobile station reports a corresponding measurement result based on the auxiliary positioning information; and a positioning module 84, configured to use the measurement result to position the mobile station.

Figure 9:
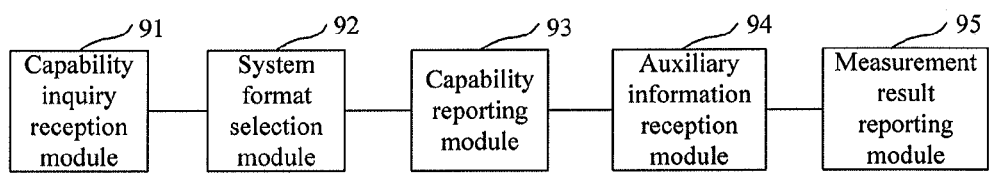
FIG. 9 is a schematic structural diagram of a mobile station using an observed time difference of arrival for positioning according to an embodiment of the present invention.

FIG. 9 is a schematic structural diagram of a mobile station using an observed time difference of arrival for positioning. As shown in FIG. 9, the mobile station for implementing the method in the embodiment shown in FIG. 4 includes: a capability inquiry reception module 91, a system format selection module 92, a capability reporting module 93, an auxiliary information reception module 94 and a measurement result reporting module 95.

The capability inquiry reception module 91 is configured to receive an observed time difference of arrival OTDOA capability request message, transmitted by a positioning server, where the OTDOA capability request message includes a plurality of communication formats existent in a current service area of the mobile station and corresponding signal reception quality information;

The system format selection module 92 is configured to select a communication system format supported by the mobile station from the plurality of communication system formats;

The capability reporting module 93 is configured to transmit to the positioning server an OTDOA support capability message, where the OTDOA support capability message includes the communication system format supported by the mobile station and corresponding signal reception quality;

The auxiliary information reception module 94 is configured to receive auxiliary positioning information sent by the positioning server;

The measurement result reporting module 95 is configured to report a corresponding measurement result based on the auxiliary positioning information, so that the positioning server use the measurement result to position the mobile station.

The mobile station using an observed time difference of arrival (OTDOA) for positioning provided in embodiments of the present invention further includes: a positioning manner judgment module, configured to, before selecting the communication system format supported by the mobile station from the plurality of communication system formats, judge whether the mobile station supports OTDOA positioning or not; at this time, the system format selection module is further configured to, if the mobile station supports the OTDOA positioning, perform selecting the communication system format supported by the mobile station from the plurality of communication system formats.

The mobile station using an observed time difference of arrival (OTDOA) for positioning provided in embodiments of the present invention can further include: a multimode judgment module, configured to, if the mobile station supports the OTDOA positioning, then before performing selecting the communication system format supported by the mobile station from the plurality of communication system formats, judge whether the mobile station supports multimode or not; at this time, the system format selection module is further configured to, if the mobile station supports multimode, select a plurality of communication system formats supported by the mobile station from the plurality of communication system formats; otherwise, select one communication system format supported by the mobile station from the plurality of communication system formats.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to some technical features in the technical solutions; however, such modifications or replacements do not cause the essence of corresponding technical solutions to depart from the spirit and scope of the embodiments of the present invention.

What is claimed is:

1. A method using an observed time difference of arrival for positioning a mobile station, comprising:

transmitting to a mobile station an observed time difference of arrival (OTDOA) capability request message to inquire about a communication system format supported by the mobile station and signal reception quality information of each base station of a communication system supported, wherein the OTDOA capability request message comprises a plurality of communication formats existent in a current service area of the mobile station and corresponding signal reception quality information, provided for the mobile station to select based on the communication system format supported by the mobile station;

receiving an OTDOA support capability message returned by the mobile station, wherein the OTDOA support capability message comprises the communication system format supported by the mobile station and corresponding signal reception quality;

sending to the mobile station auxiliary positioning information based on the communication system format supported by the mobile station and the corresponding signal reception quality, so that the mobile station reports a corresponding measurement result based on the auxiliary positioning information; and using the measurement result to position the mobile station.

2. The method using an observed time difference of arrival for positioning a mobile station according to claim 1, wherein the OTDOA support capability message comprises a plurality of communication system formats supported by the mobile station.

3. A method using an observed time difference of arrival for positioning a mobile station, comprising:
   receiving an observed time difference of arrival (OTDOA) capability request message, transmitted by a positioning server, wherein the OTDOA capability request message comprises a plurality of communication formats existent in a current service area of the mobile station and corresponding signal reception quality information;
   selecting a communication system format supported by the mobile station from the plurality of communication system formats;
   transmitting to the positioning server an OTDOA support capability message, wherein the OTDOA support capability message comprises the communication system format supported by the mobile station and corresponding signal reception quality;
   receiving auxiliary positioning information sent by the positioning server; and
   reporting a corresponding measurement result based on the auxiliary positioning information, so that the positioning server uses the measurement result to position the mobile station.

4. The method using an observed time difference of arrival for positioning a mobile station according to claim 3, wherein, before selecting the communication system format supported by the mobile station from the plurality of communication system formats, the method further comprises:
   judging whether the mobile station supports OTDOA positioning or not, if the mobile station supports the OTDOA positioning, performing selecting the communication system format supported by the mobile station from the plurality of communication system formats; otherwise, using other positioning manner to position.

5. The method using an observed time difference of arrival for positioning a mobile station according to claim 4, wherein, if the mobile station supports the OTDOA positioning, before performing selecting the communication system format supported by the mobile station from the plurality of communication system formats, the method further comprises:
   judging whether the mobile station supports multimode or not, if the mobile station supports multimode, then the procedure of selecting the communication system format supported by the mobile station from the plurality of communication system formats comprises: selecting a plurality of communication system formats supported by the mobile station from the plurality of communication system formats; otherwise, the procedure of selecting the communication system format supported by the mobile station from the plurality of communication system formats comprises: selecting one communication system format supported by the mobile station from the plurality of communication system formats.

6. A positioning server using an observed time difference of arrival for positioning a mobile station, comprising:
   a capability inquiry module, configured to transmit to a mobile station an observed time difference of arrival (OTDOA) capability request message to inquire about a communication system format supported by the mobile station and signal reception quality information of each base station of a communication system supported, wherein the OTDOA capability request message comprises a plurality of communication formats existent in a current service area of the mobile station and corresponding signal reception quality information, provided for the mobile station to select based on the communication system format supported by the mobile station;
   a capability reception module, configured to receive an OTDOA support capability message returned by the mobile station, wherein the OTDOA support capability message comprises the communication system format supported by the mobile station and corresponding signal reception quality;
   an auxiliary information sending module, configured to send to the mobile station auxiliary positioning information based on the communication system format supported by the mobile station and the corresponding signal reception quality, so that the mobile station reports a corresponding measurement result based on the auxiliary positioning information; and
   a positioning module, configured to use the measurement result to position the mobile station.

7. A mobile station using an observed time difference of arrival for positioning, comprising:
   a capability inquiry reception module, configured to receive an observed time difference of arrival (OTDOA) capability request message, transmitted by a positioning server, wherein the OTDOA capability request message comprises a plurality of communication formats present in a current service area of the mobile station and corresponding signal reception quality information;
   a system format selection module, configured to select a communication system format supported by the mobile station from the plurality of communication system formats;
   a capability reporting module, configured to transmit to the positioning server an OTDOA support capability message, wherein the OTDOA support capability message comprises the communication system format supported by the mobile station and corresponding signal reception quality;
   an auxiliary information reception module, configured to receive auxiliary positioning information sent by the positioning server;
   a measurement result reporting module, configured to report a corresponding measurement result based on the auxiliary positioning information, so that the positioning server uses the measurement result to position the mobile station.

8. The mobile station using an observed time difference of arrival for positioning according to claim 7, further comprising:
   a positioning manner judgment module, configured to, before selecting the communication system format supported by the mobile station from the plurality of communication system formats, judge whether the mobile station supports OTDOA positioning or not;
   wherein the system format selection module is configured to, if the mobile station supports the OTDOA positioning, perform selecting the communication system format supported by the mobile station from the plurality of communication system formats.

9. The mobile station using an observed time difference of arrival for positioning according to claim 8, further comprising:
   a multimode judgment module, configured to, if the mobile station supports the OTDOA positioning, then before performing selecting the communication system format supported by the mobile station from the plurality of communication system formats, judge whether the mobile station supports multimode or not;

wherein the system format selection module is further configured to, if the mobile station supports multimode, select a plurality of communication system formats supported by the mobile station from the plurality of communication system formats; otherwise, select one communication system format supported by the mobile station from the plurality of communication system formats.

* * * * *